No. 872,395. PATENTED DEC. 3, 1907.
P. D. WELLS.
FENDER ADJUSTER.
APPLICATION FILED APR. 18, 1907.
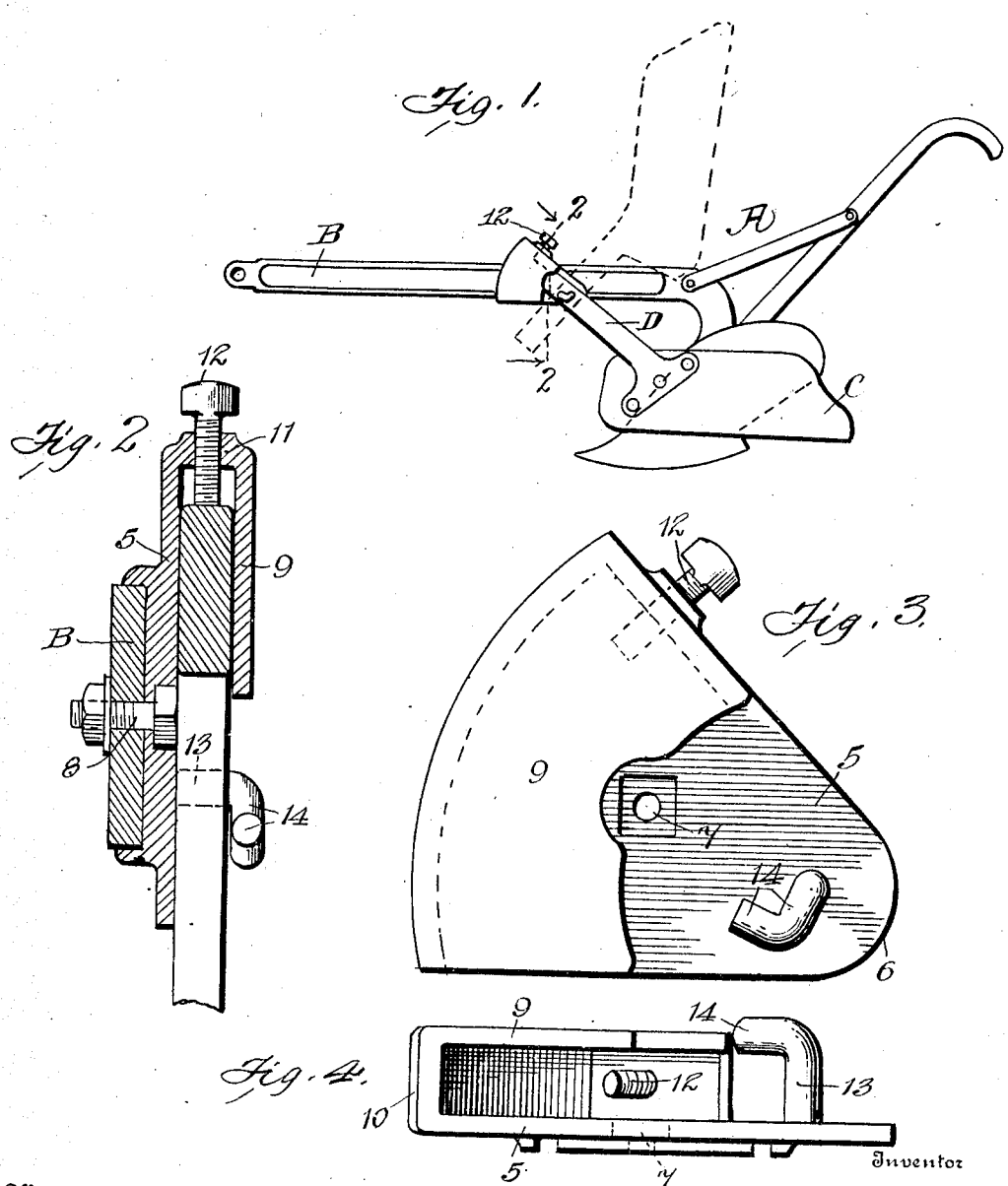

UNITED STATES PATENT OFFICE.

PARMER D. WELLS, OF AIX, INDIANA.

FENDER-ADJUSTER.

No. 872,395.      Specification of Letters Patent.      Patented Dec. 3, 1907.

Application filed April 18, 1907. Serial No. 368,948.

*To all whom it may concern:*

Be it known that I, PARMER D. WELLS, a citizen of the United States, residing at Aix, in the county of Jasper and State of Indiana, have invented certain new and useful Improvements in Fender-Adjusters, of which the following is a specification.

My invention relates to a device for adjusting plow fenders, and the objects thereof are to provide a mechanism capable of attachment to plows already in use, which will be easier and quicker in its adjustment of the fender, while accurate in its operation, and which will be simple and inexpensive while substantial and strong in its construction.

Further my invention resides in the following features of construction, arrangement and operation as will be hereinafter described and pointed out in the accompanying drawings, in which, Figure 1 is an elevation showing the practical application of my improvements. Fig. 2 is an enlarged sectional view on the line 2—2 of Fig. 1. Fig. 3 is a face view of my improved device, and Fig. 4 is a side view thereof.

Referring to the figures, A indicates a plow, provided with a beam B, and a fender C, which as usual is provided with an elongated shank D.

In the practical embodiment of my invention I provide a segmental plate 5, terminating in a rounded apex 6, and provided with a countersunk central opening 7, adapted to receive a bolt 8 which may also be passed through an opening provided in the plow beam B in order to securely hold the plate 5 thereon. The segmental plate 5 is provided with a partial cover 9, closing the curved butt end 10, and providing a suitable bearing at 11 for an adjusting screw 12 which projects within the space between the plate 5 and the cover 9. Adjacent its rounded apex 6 the plate 5 is provided with a pivot pin 13 having angular extensions 14 upon its outer end.

In the application of my device I provide the shank D of the fender C with an opening at a selected point adapted to fit about the pivot pin 13. As shown in dotted lines in Fig. 1 the fender shank D and fender C must be held upwardly until the opening in the shank has been inserted about the pivot pin 13 when the weight of the fender will cause the end of the shank to move within the space between the plate 5 and its cover 9, forming a housing for the same, and will tend to hold said shank end tightly pressed against the adjusting screw 12. Thus when it is desired to change the position of the plow C, it is simply necessary to turn the screw 12 which will bear directly upon the housed end of the fender shank D, and will adjust the fender C to the desired degree by means of the removable pivotal mounting of said shank upon the pin 13.

Having thus fully described my invention I claim:

In a plow fender adjuster, the combination with a fender and its shank provided with an opening adjacent its end, of a segmental housing attachable to the plow beam and terminating in a rounded point, said housing comprising a base plate, and a partial cover therefore closing one end and providing a suitable bearing for an adjusting screw, said housing being provided with a pin extending upwardly therefrom adjacent said rounded point and said pin having angular extensions at its upper portion adapted for insertion through said opening in said shank to detachably, pivotally hold the same with its end between said base plate and said cover and against said adjusting screw, substantially as described.

In testimony whereof I affix my signature in presence of two witnesses.

PARMER D. WELLS.

Witnesses:
     SCOTT ROBINSON,
     HUGH SPAULDING.